US009778467B1

(12) United States Patent
White et al.

(10) Patent No.: US 9,778,467 B1
(45) Date of Patent: Oct. 3, 2017

(54) HEAD MOUNTED DISPLAY

(71) Applicants: Daryl White, Colleyville, TX (US);
Peter R. Schnabel, Victoria (CA);
Christopher David Glen Robertson, Victoria (CA); Joanne Parker Robertson, Victoria (CA)

(72) Inventors: Daryl White, Colleyville, TX (US);
Peter R. Schnabel, Victoria (CA);
Christopher David Glen Robertson, Victoria (CA); Joanne Parker Robertson, Victoria (CA)

( * ) Notice: Subject to any disclaimer, the term of this patent is extended or adjusted under 35 U.S.C. 154(b) by 0 days.

(21) Appl. No.: 15/057,141

(22) Filed: Mar. 1, 2016

(51) Int. Cl.
*G02B 27/01* (2006.01)
*G06T 19/00* (2011.01)

(52) U.S. Cl.
CPC ..... *G02B 27/0176* (2013.01); *G02B 27/0172* (2013.01); *G06T 19/006* (2013.01); *G02B 2027/0154* (2013.01); *G02B 2027/0169* (2013.01)

(58) Field of Classification Search
None
See application file for complete search history.

(56) References Cited

U.S. PATENT DOCUMENTS

| 5,138,555 A * | 8/1992 | Albrecht | G02B 27/017 340/980 |
| 2015/0363976 A1* | 12/2015 | Henson | H04N 13/044 345/419 |
| 2016/0063767 A1* | 3/2016 | Lee | G06T 19/006 345/419 |

* cited by examiner

*Primary Examiner* — Nicholas Lee
(74) *Attorney, Agent, or Firm* — Damon R. Hickman Law Firm, P.C.

(57) ABSTRACT

A system for providing virtual reality imagery to a rider of an amusement park ride having a headgear piece for securing a viewing screen to a head of the rider. The viewing screen is removable from the headgear piece to allow the headgear piece to be cleaned and sanitized.

8 Claims, 17 Drawing Sheets

HEAD MOUNTED DISPLAY

BACKGROUND

1. Field of the Invention

The present invention relates generally to virtual reality headsets for amusement/theme park attractions, and more specifically to a system and method for providing virtual reality to amusement park guests comprising a guest worn tethered headset.

2. Description of Related Art

Various amusement attractions have been developed using Virtual Reality (VR) technology allowing patrons to view and interact with a virtual environment. Typical systems in existence are comprised of a VR headgear system and a motion base. Typical VR headgear uses a screen permanently housed within an enclosure worn by a guest. The enclosure typically includes soft materials that are difficult to properly sanitize. The enclosure is affixed to the head of the patron by means of an elastic headband or similar measure. This conventional system of attaching the headgear to the patron is functional, however, it is difficult and time consuming to properly clean and sanitize the headgear after one patron has completed the attraction experience and prior to the next patron beginning the attraction experience. This difficulty leads to a decrease in throughput of the attraction. A potential solution to, increase throughput is for the park operator to purchase an additional entire set of VR headgear devices. This potential solution leads to increased Cost Per User and overall Cost Of Operation.

While there are many systems for virtual reality headsets well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
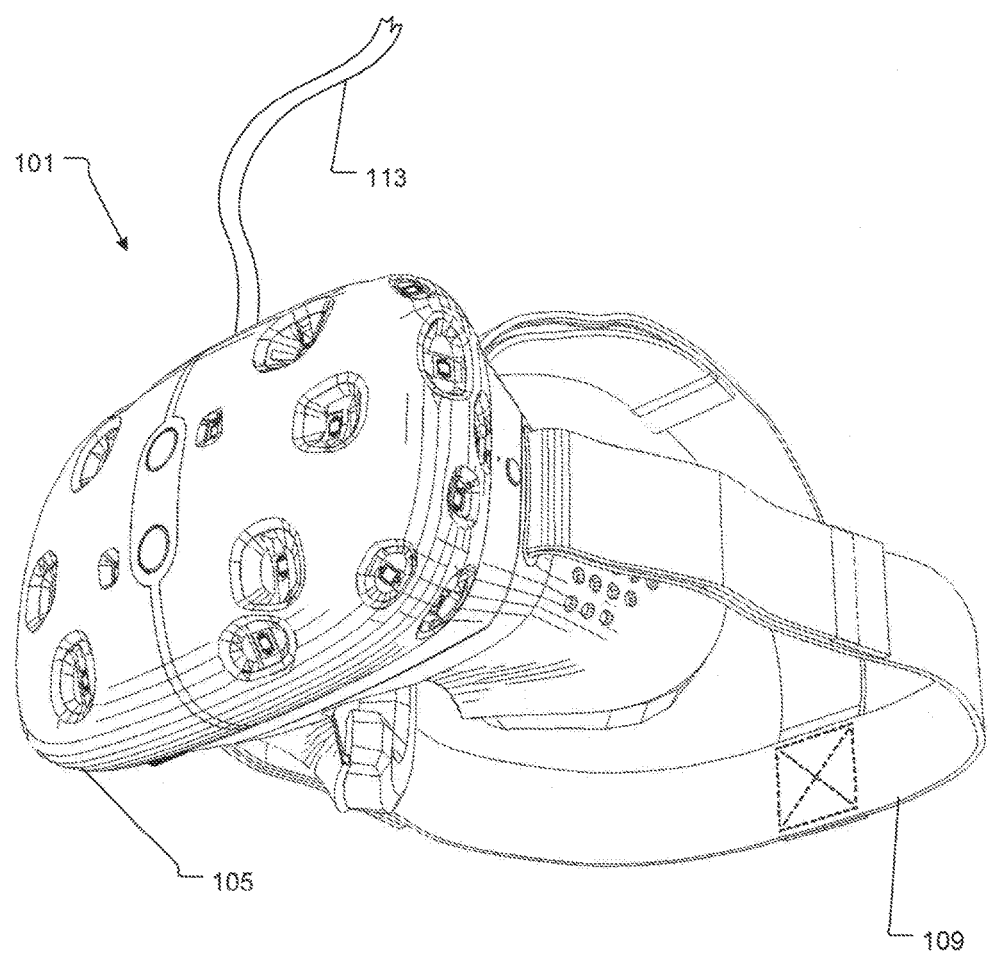
FIG. 1 is a perspective view of a virtual reality headgear device for an amusement attraction illustrated according to the present application.
Figure 2:
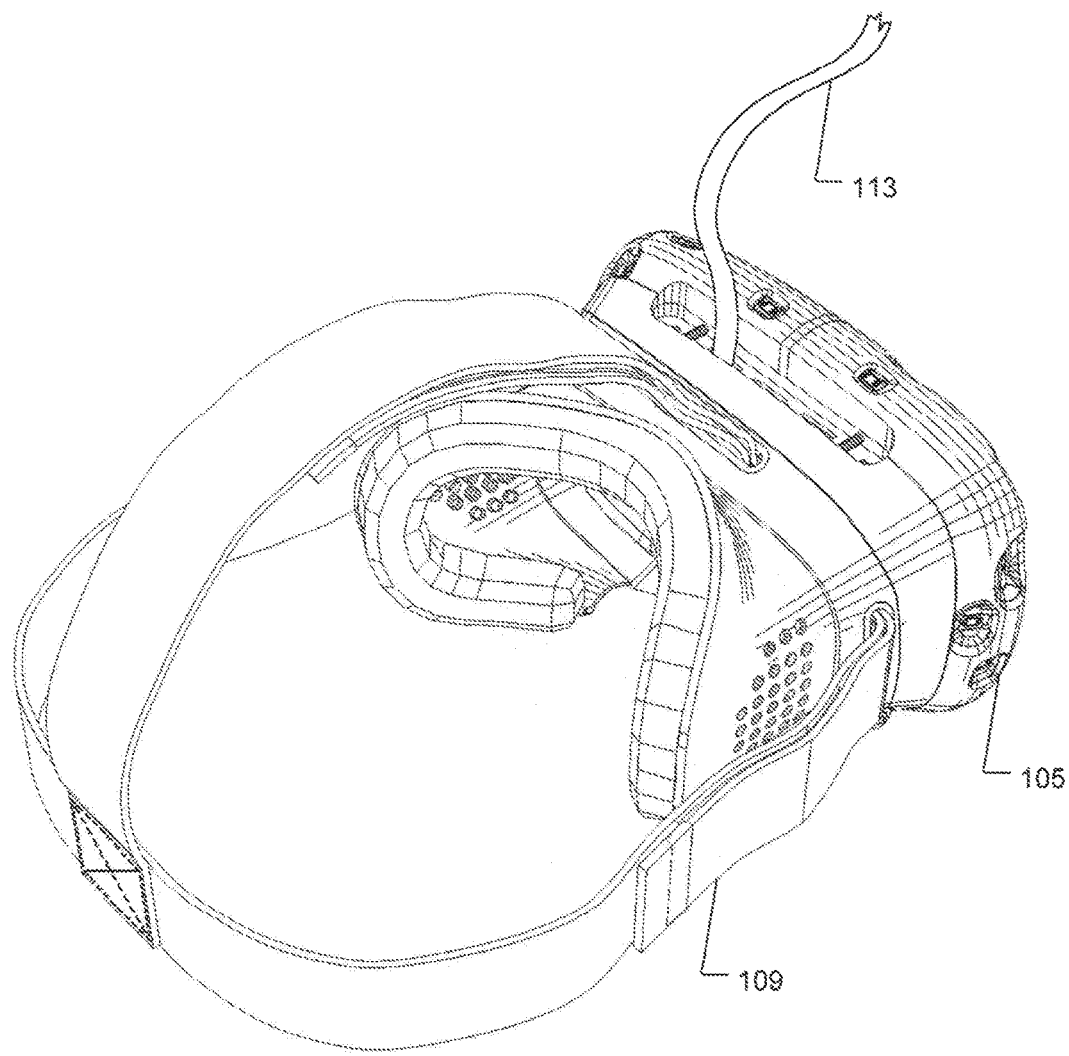
FIG. 2 is a perspective view of a virtual reality headgear device for an amusement attraction illustrated according to the present application.
Figure 3:
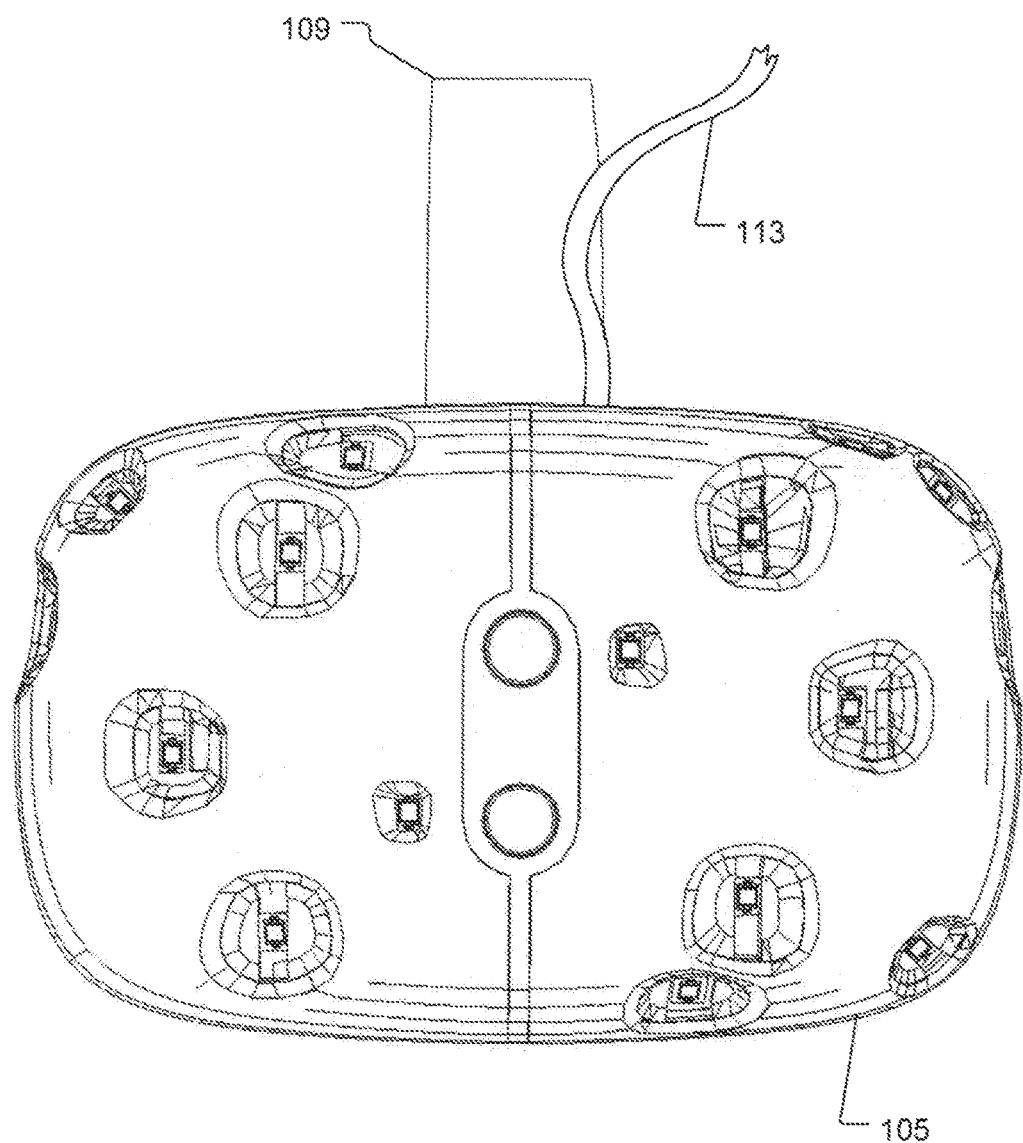
FIG. 3 is a front view of a virtual reality headgear device for an amusement attraction illustrated according to the present application.
Figure 4:
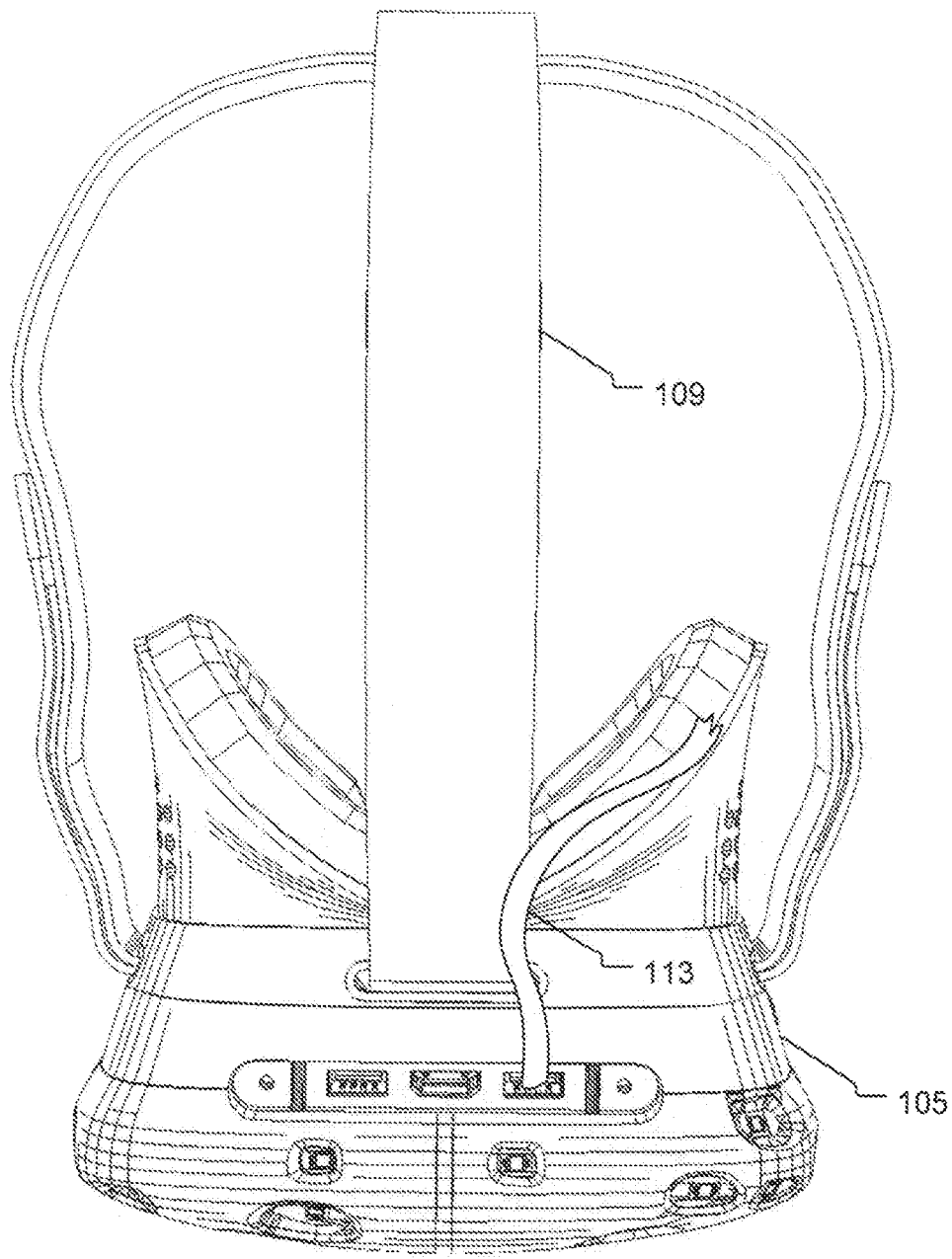
FIG. 4 is a top view of a virtual reality headgear device for an amusement attraction illustrated according to the present application.
Figure 5:
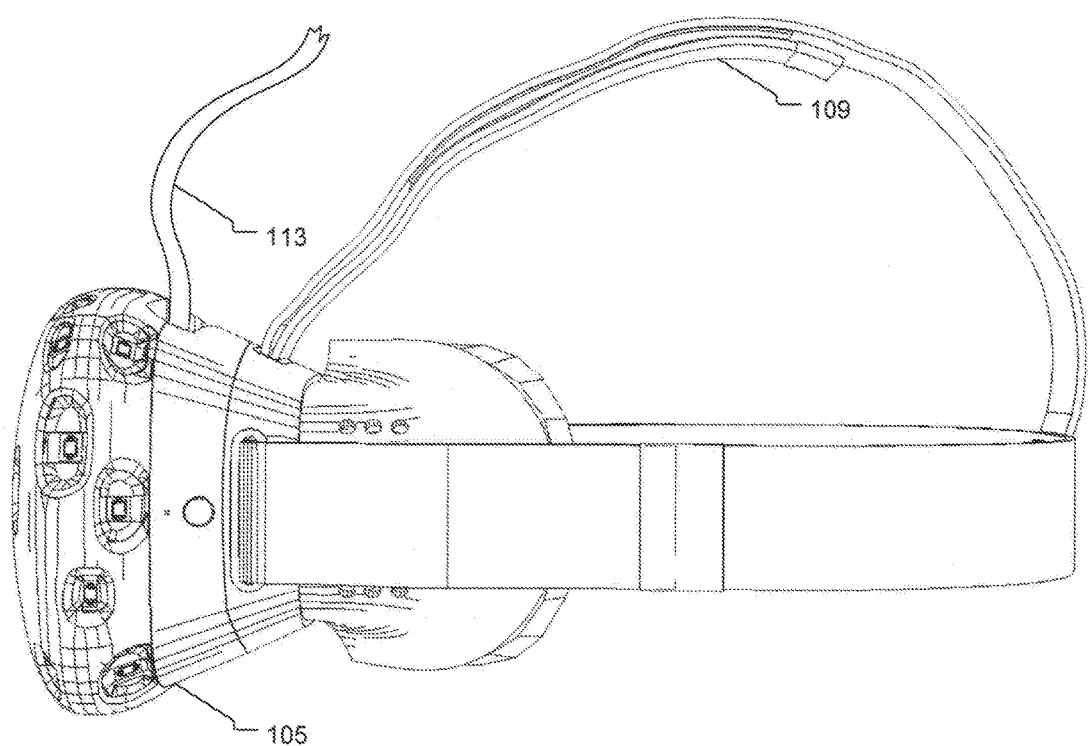
FIG. 5 is a side view of a virtual reality headgear device for an amusement attraction illustrated according to the present application.
Figure 6:
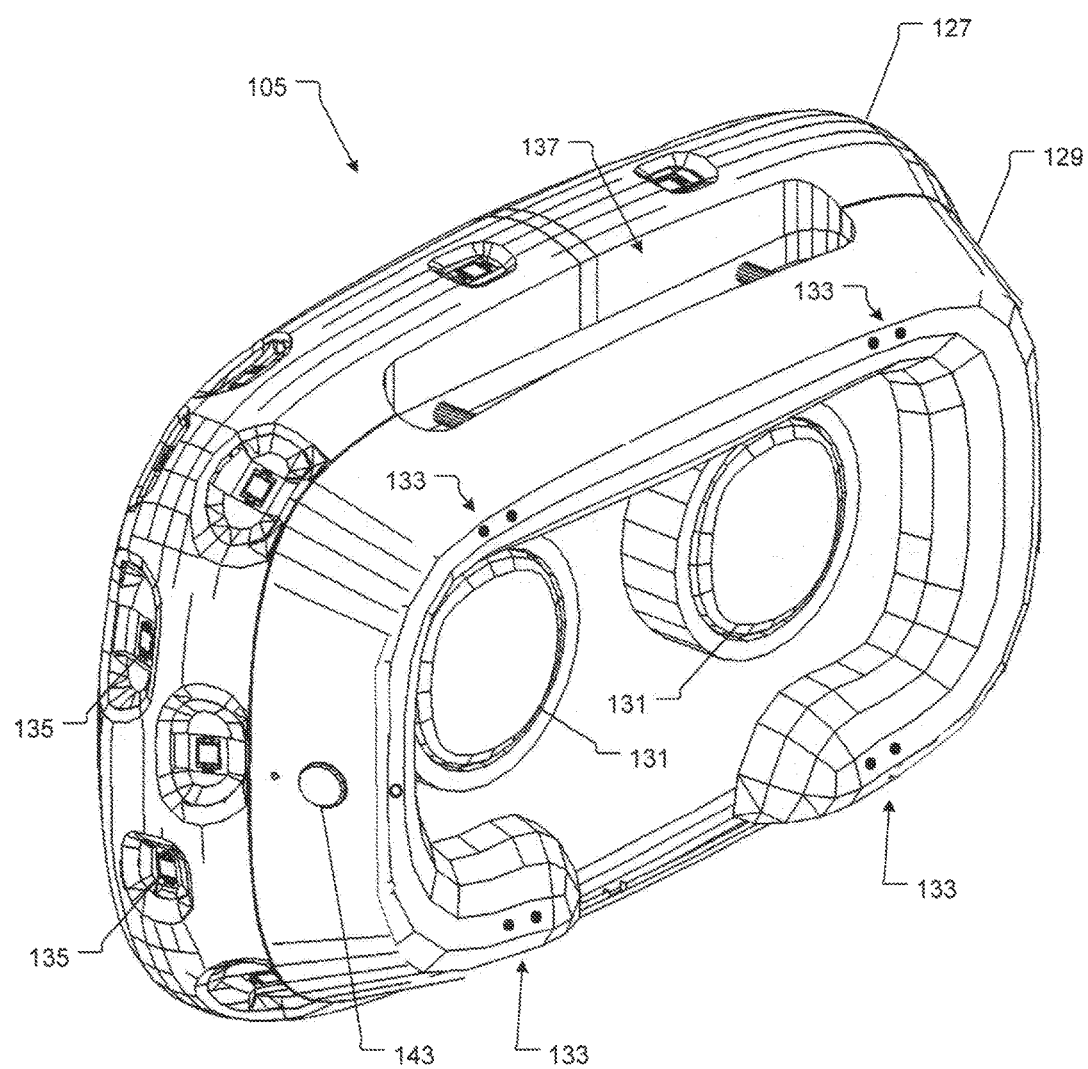
FIG. 6 is a perspective view of a viewing screen for a virtual reality headgear device of an amusement attraction illustrated according to the present application.
Figure 7:
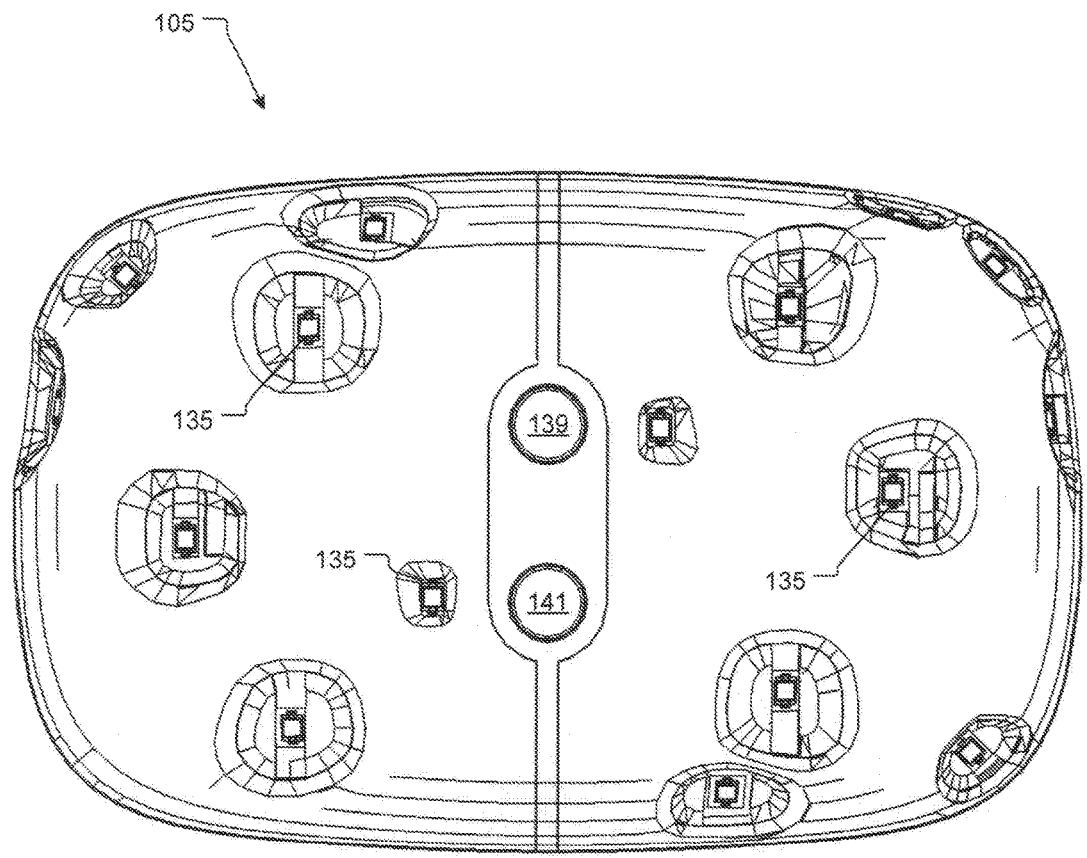
FIG. 7 is a front view of a viewing screen for a virtual reality headgear device of an amusement attraction illustrated according to the present application.
Figure 8:
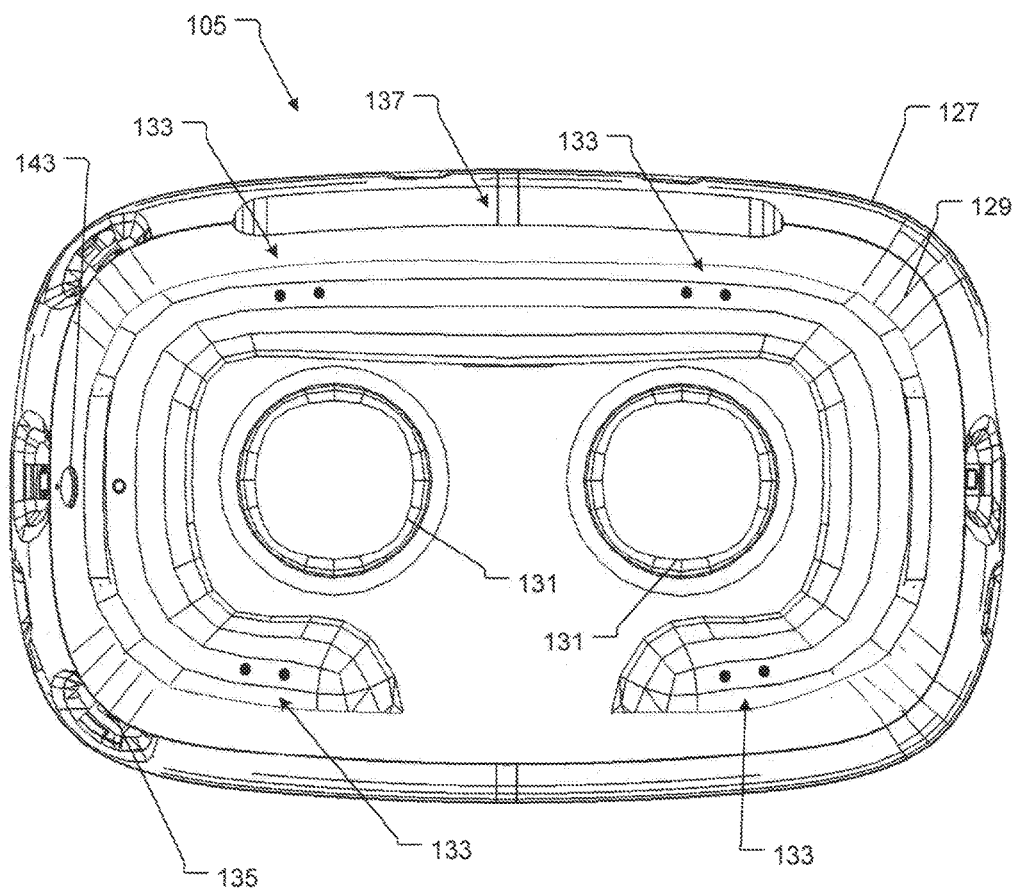
FIG. 8 is a back view of a viewing screen for a virtual reality headgear device of an amusement attraction illustrated according to the present application.
Figure 9:
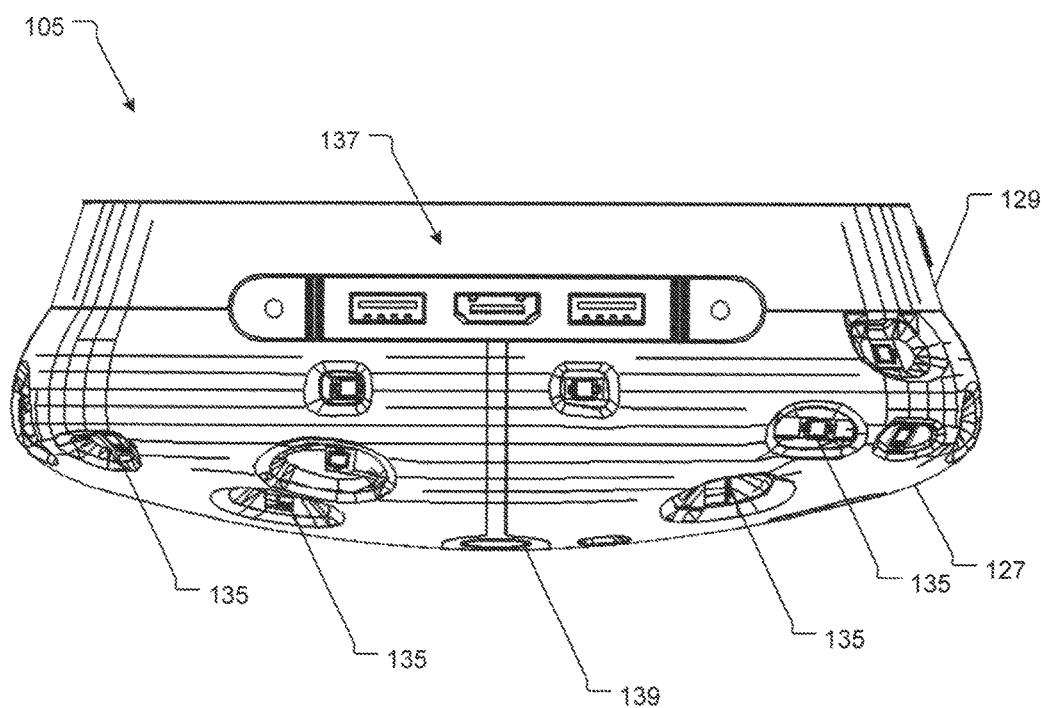
FIG. 9 is a top view of a viewing screen for a virtual reality headgear device of an amusement attraction illustrated according to the present application.
Figure 10:
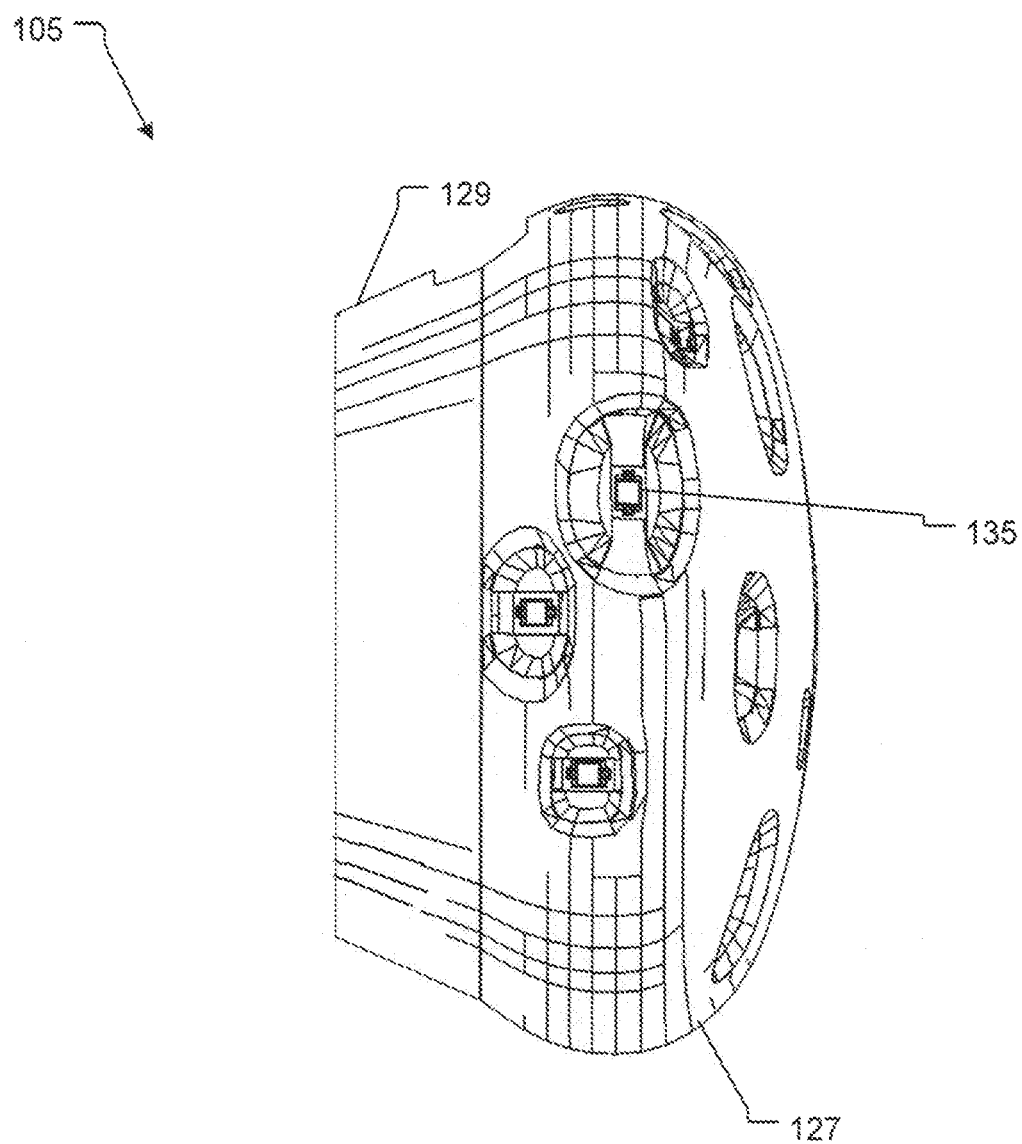
FIG. 10 is a side view of a viewing screen for a virtual reality headgear device of an amusement attraction illustrated according to the present application.
Figure 11:
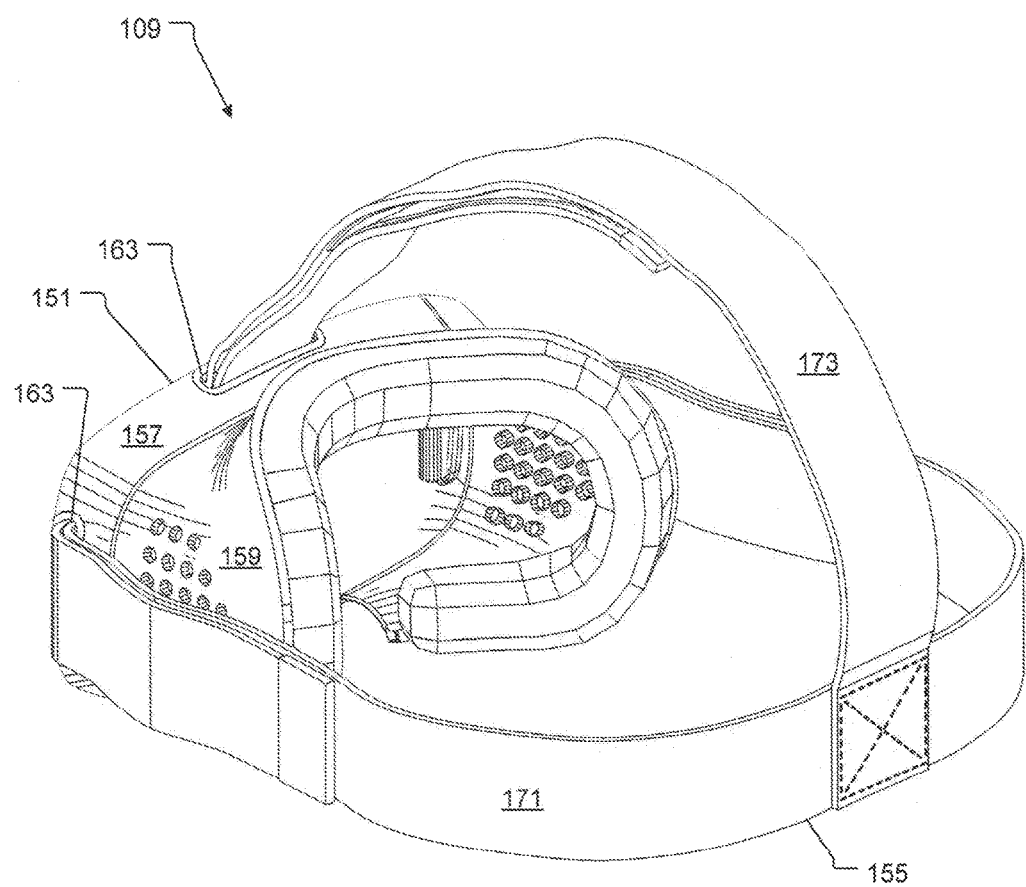
FIG. 11 is a perspective view of a headgear piece for a virtual reality headgear device of an amusement attraction illustrated according to the present application.
Figure 12:
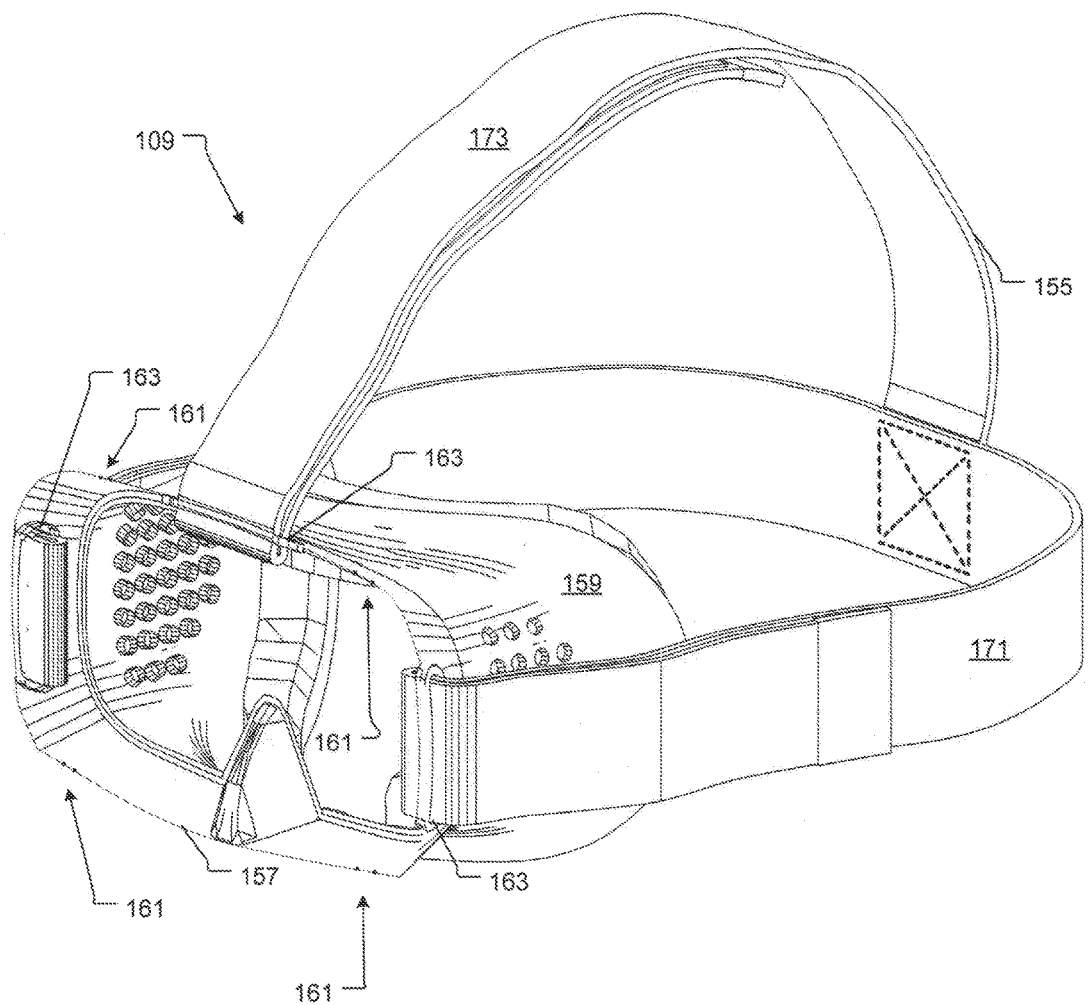
FIG. 12 is a perspective view of a headgear piece for a virtual reality headgear device of an amusement attraction illustrated according to the present application.
Figure 13:
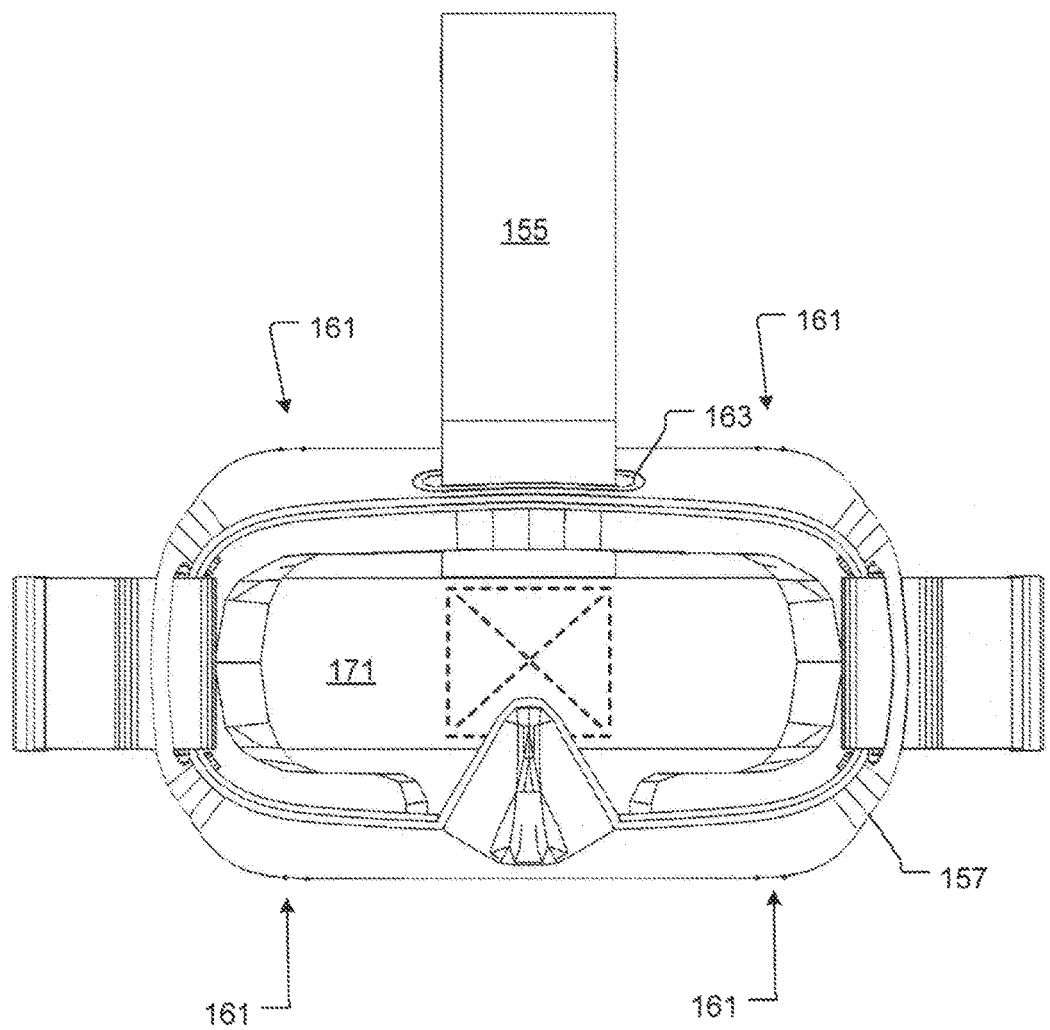
FIG. 13 is a front view of a headgear piece for a virtual reality headgear device of an amusement attraction illustrated according to the present application.
Figure 14:
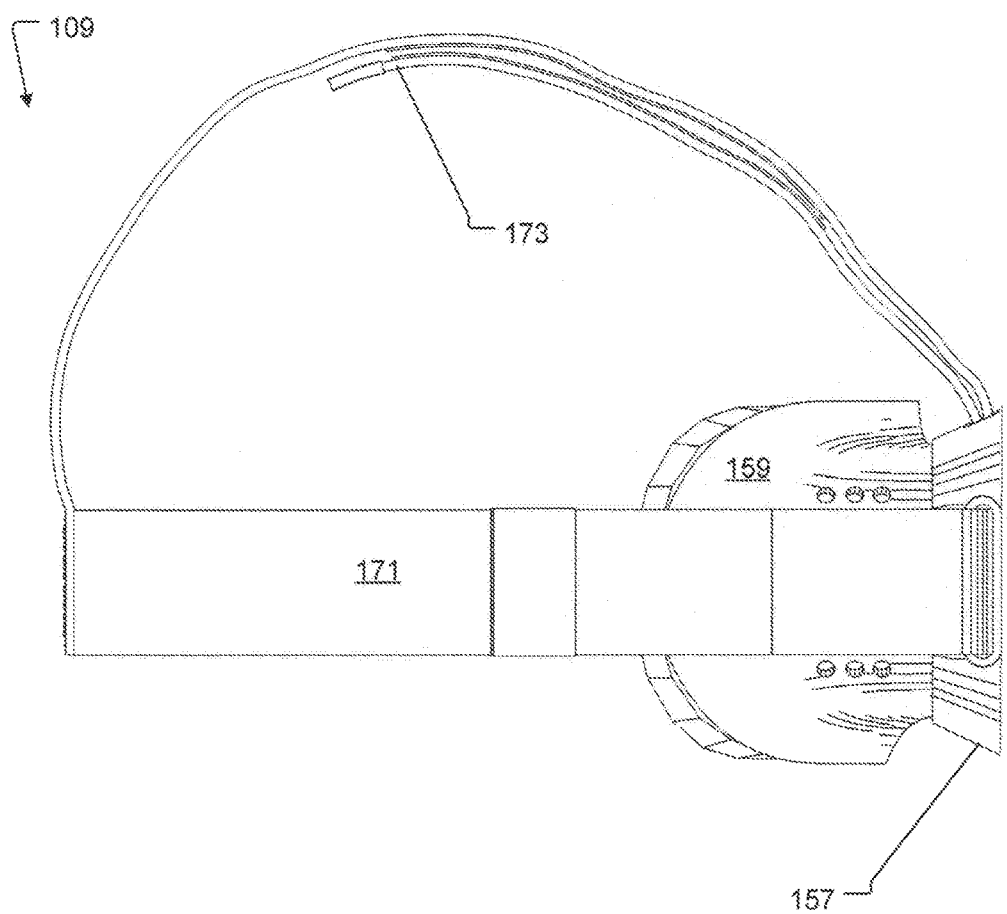
FIG. 14 is a side view of a headgear piece for a virtual reality headgear device of an amusement attraction illustrated according to the present application.

While the assembly of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the apparatus for a head mounted display are provided below. It will of course be appreciated that in the development of any actual embodiment, numerous implementation-specific decisions will be made to achieve the developer's specific goals, such as compliance with assembly-related and business-related constraints, which will vary from one implementation to another, Moreover, it will be appreciated that such a development effort might be complex and time-consuming, but would nevertheless be a routine undertaking for those of ordinary skill in the art having the benefit of this disclosure.

The improved severable head mounted display increases the theoretical hourly capacity of an amusement park ride featuring virtual reality provided individually to riders by reducing the time to sanitize the headgear. The time for cleaning and sanitizing head mounted displays can be reduced by configuring the system to allow the display to be removable. Once the display, with sensitive components, has been removed from the headgear, cleaning of the headgear piece can be completed, remotely away from the ride, with processes and chemicals not possible if the electronic viewing portion was still attached. Additionally, the cost of the headgear piece is minor as compared to the display.

Referring now to FIGS. 1-5 in the drawings, views of an improved head mounted display illustrated according to the present application. Head mounted display 101 is comprised of a viewing screen 105 coupled to a headgear piece 109. Viewing screen 105 is preferably coupled to the headgear piece 109 by magnets. Viewing screen 105 is alternatively coupled to the headgear piece 109 by mechanical fasteners. The physical connection between the viewing screen 105 and the headgear piece 109 is sufficiently strong enough to secure the viewing screen to the headgear piece 109 while the user is wearing the head mounted display 101 while being moved by an articulated motion base.

Viewing screen 105 is tethered back to a point external to the headgear piece typically a rigid part of the virtual reality ride located on the articulated motion base. Tether 113 is comprised of electrical wiring and a security cable. Tether 113 retains the viewing screen such that the user cannot remove the viewing screen from the ride. Tether 113 also provides power and data communications from a controller to the viewing screen 105, Alternatively the tether 113 merely retains the viewing screen 105 to a stationary mounting location such as the ride, a vehicle, or a motion base and power and data to the viewing screen is provided separately. Tether 113 can support the viewing screen in a hanging position without additional support. In the embodiment where the tether does not provide power and data, the power is supplied by rechargeable batteries located in the viewing screen and data is supplied wirelessly. Furthermore, headgear piece 109 may comprise batteries to power the viewing screen 105.

Referring now to FIGS. 6-10 in the drawings, views of a display portion of an improved head mounted display illustrated according to the present application. Viewing screen 105 or viewing system is comprised of a main portion 127, a closeout portion 129, and at least one screen 131 for displaying images to a user. Preferably viewing screen 105 includes a first screen and a second screen. In the preferred embodiment, each of the first and the second screens displays a different image in order to provide the user a stereoscopic view and appear as a three dimensional image. An alternative embodiment includes displaying the same image on both the first and the second screens for a two-dimensional image presentation to the user. Viewing screens 105 are raised from a flat back surface of the main portion 127. Surrounding the viewing screens 105 is the closeout portion 129. Closeout portion 129 forms a ridge like structure around the viewing screens. When closeout portion 129 is coupled to the headgear piece external light is minimized by the closeout portion.

Closeout portion 129 comprises a system of couplers 133 configured to couple the viewing screen 105 to the headgear piece. Preferably couplers 133 are high strength magnets to removably affix and align the viewing screen to the headgear piece. Magnets are located in pairs around an aft edge of the closeout portion. By locating the magnets around the edge in pairs a strong physical connection between the viewing screen and the headgear piece is created.

Alternatively to the magnets or in addition to the magnets are mechanical fasteners configured to removeably affix and align the view screen 105 to the headgear piece. For example, the viewing screen 105 comprises grooves configured to retain ridges on the headgear piece.

Viewing screen further comprises a head tracking system comprising a plurality of tracking sensors 135 distributed across a forward surface of the main portion 127 of the viewing screen 105, various electrical and mechanical ports 137 to couple the tether to, a first camera 139, and a second camera 141. Tracking sensors are recessed into the forward surface and edges of the main portion 127. Recessing the sensors enables the controller to determine the gaze of the user as some of the tracking sensors 135 will be occluded based upon the position of the viewing screen. A light source located proximally to the viewing screen is fixed relative to the motion of the ride and to the motion of the head mounted display preferably in front of the user. The controller knowing the location of the light source can measure positional information by determining which tracking sensors 136 are seeing the light source and which sensors are not seeing the light source. Tracking sensors 135 are preferably light sensitive sensors capable of providing feedback to the controller regarding position, velocity, and acceleration of the headset while worn by a user. Tracking sensors work by measuring light emitted by fixed light emitters located adjacently the motion platform. Additional sensors located in the viewing screen, such as accelerometers and gyroscopes, can provide positional data to the controller in addition to or in replacement of the light trackers.

As many patrons will be in the same area during the ride a plurality of head mounted displays will be utilized concurrently, the system must be able to individually track the head of each patron independently. Mounting the detectors on the headsets reduces the controller's workload in determining the position of each headset. However, other configurations are contemplated by this application. For example, the light detectors can be located at a fixed point adjacent the ride and the light emitters located on the head mounted displays. While optical tracking, with both active and passive markers, of the head mounted display is preferred, additionally and or alternatively inertial tracking is utilized by the system to track the user's head during the ride.

The various electrical and mechanical ports 137 are typically comprised of universal serial bus ports, high definition multimedia interfaces receptacles, mechanical studs, direct current receptacles, and or threaded fasteners. The various electrical and mechanical ports 137 are configured to enable power and data to be delivered and transmitted from the head mounted display and the controller. Additionally the head mounted display can be tethered to a surface to reduce theft and loss. While the ports are preferably located on the top of the head mounted display it should be apparent that other locations on the head mounted display are contemplated.

First camera 139 and second camera 141 provide the controller and the at least one screen 131 with data and imagery from around the user for integration into the virtual reality experience. For example, a rider could view scenery on the at least one screen 131 with a virtual image overlaid to create an augmented reality. Additionally, the first camera 139 and the second camera 141 can provide object tracking data to the controller. For example, as a user raises their hands in front of their head the cameras in conjunction with the controller can determine the position of the user's hands, wrists, and arms. This increases the reality of the amusement ride as the user's own movements are integrated into the experience without the need for sensors located on the user's hands, wrists, or arms. Furthermore, speakers can be located on the head mounted display to provide individualized auditory information to the riders.

In order to aid the user in breaking the bond between the viewing screen and the headgear piece a release 143 is located on the viewing screen. Release 143, when depressed by a user, forces the viewing screen away from the headgear piece. Release 143 is comprised of a button and rod that translates. Depressing the button pushed the rod which then separates the viewing screen from the headgear piece. Once a magnetic plane has been broken the user can easily pull the viewing screen away from the headgear piece. Alternatively, the release may be remotely controlled by the ride controller so at the end of the ride the screen is popped off the headgear piece with an actuator and pulled up by the tether to be used by the next rider.

Referring now to FIGS. 11-14 in the drawings, views of a mounting portion of an improved head mounted display illustrated according to the present application. Headgear piece 109 is comprised of masking member 151 and strapping system 155. Masking member 151 is comprised of a viewing screen interface member 157, a closeout member 159, and couplers 161. Viewing screen interface member 157 is configured to couple the headgear piece 109 to the viewing screen 105. Viewing screen interface member 157 uses bifurcated openings 163 to couple to the strapping system 155. Closeout member 159 is configured to be in direct contact with the users face around their eyes and is padded. Closeout member 159 typically features a plurality of openings to allow for air to circulate from inside the closeout member. Headgear piece 109 is preferably fabricated from plastic capable of being washed at a high temperature in a commercial grade dishwasher repeatedly without degrading.

Preferably couplers 161 are high strength magnets to removably affix and align the viewing screen to the headgear piece. Magnets are located in pairs around a forward edge of the viewing screen interface member 151. By locating the magnets around the edge in pairs a strong physical connection between the viewing screen and the headgear piece is obtained. Couplers 161 are located and magnetized to couple to couplers 133. For example, the magnets on the viewing screen have a first pole and the magnets on the headgear piece have a second pole not equal to the pole of the viewing screen so the two halves of the head mounted display are rigidly held together. Alternatively to the magnets or in addition to the magnets are mechanical fasteners configured to removeably affix and align the view screen 105 to the headgear piece.

Strapping system 155 is comprised of first strap 171 and a second strap 173. First strap 171 is affixed to the second strap 173 typically by sewing to form the strapping system 155 having three ends. The three ends of the strapping system are wrapped through the bifurcated openings 163 of the viewing screen interface member 151 and secure back to the strapping system with the use of a hook and loop attachment. A length of the first strap 171 and a length of the second strap 173 can be adjusted by the user by adjusting the amount of strap through the bifurcated opening and securing the hook and loop attachments.

Figure 15:
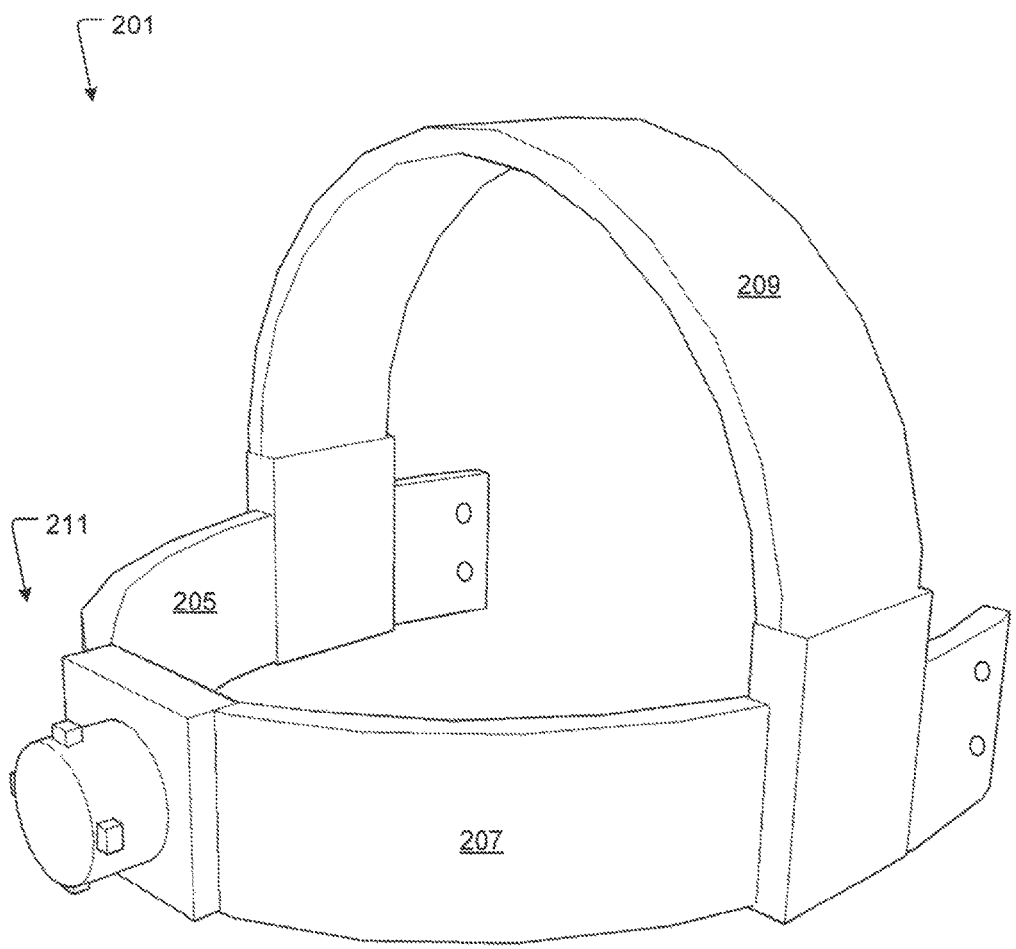
FIG. 15 is a perspective view of an alternative headgear piece for a virtual reality headgear device of an amusement attraction illustrated according to the present application.
Figure 16:
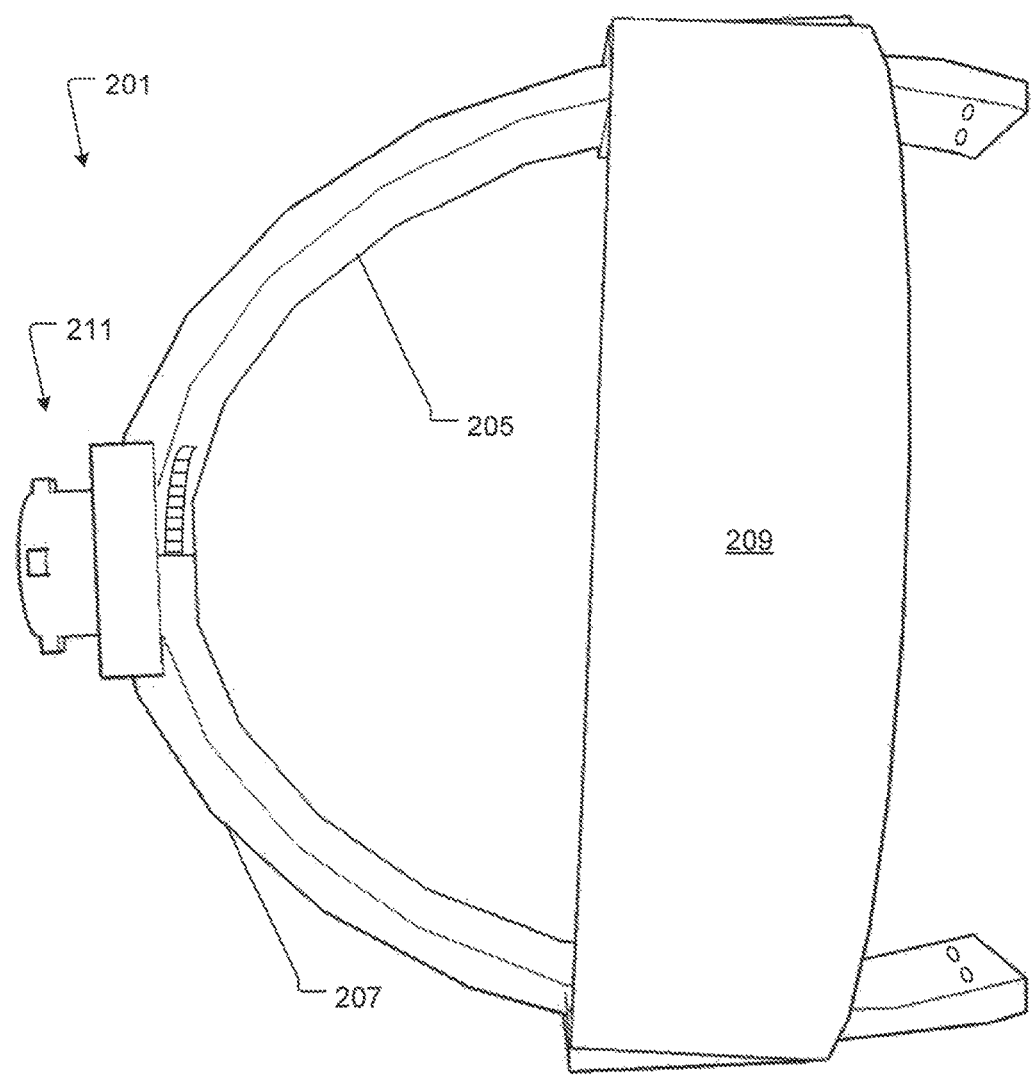
FIG. 16 is a top view of an alternative headgear piece for a virtual reality headgear device of an amusement attraction illustrated according to the present application.
Figure 17:
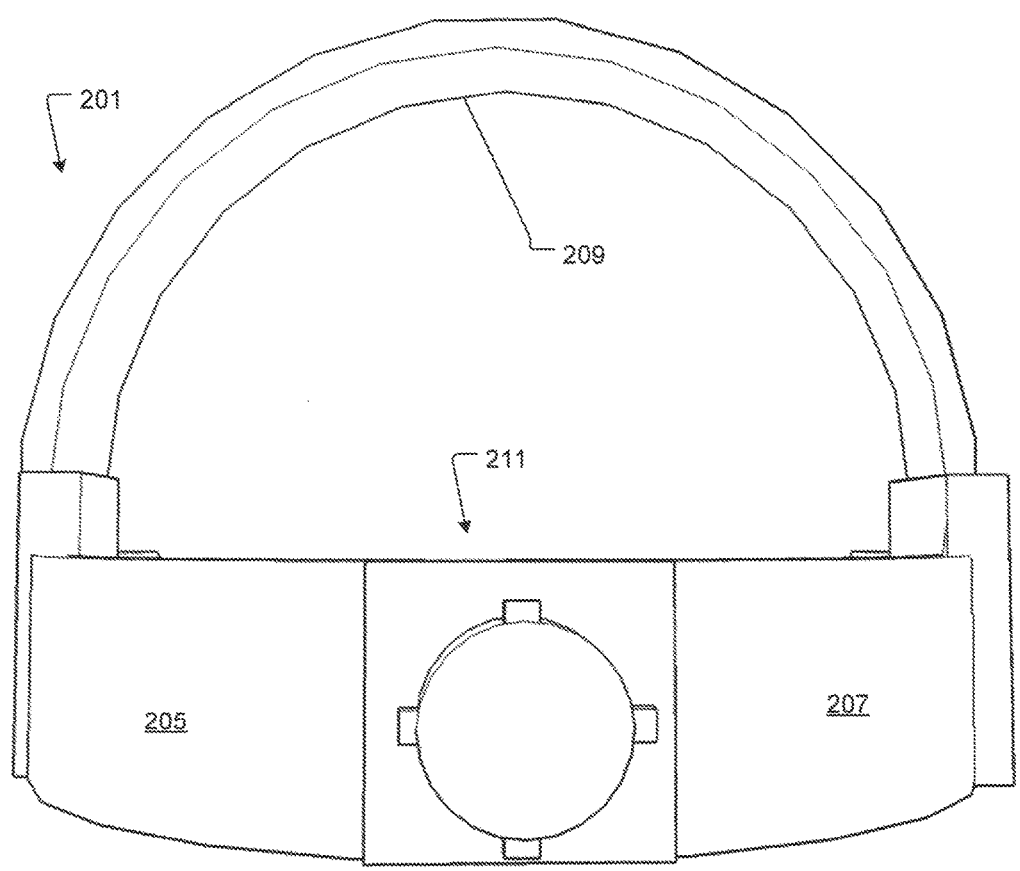
FIG. 17 is a top view of an alternative headgear piece for a virtual reality headgear device of an amusement attraction illustrated according to the present application.

Referring now to FIGS. 15-17 in the drawings, views of an alternative mounting portion of an improved head mounted display illustrated according to the present application. Alternative strapping system 201 is comprised of a first horizontal member 205, a second horizontal member 207, a vertical member 209 coupled between the first horizontal member and the second horizontal member, and an adjustment member 211. Adjustment member 211 is comprised of a knob coupled to a ratcheting gear for moving the first horizontal member 205 relative to the second horizontal member 207. The movement allows a user to place the head mounted display with the alternative strapping system 201 onto their head and tighten the strapping system until the display is sufficiently snug to prevent the head mounted display moving relative to the user's head. Once the ride is complete and the user wished to remove the head mounted display tension in the adjustment member 211 is released and the unit can be pulled from the user's head. Alternative strapping system 201 is preferably fabricated from plastic capable of being washed in a commercial grade dishwasher repeatedly without degrading.

It is apparent that an assembly and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A severable head mounted virtual reality display for an amusement park ride comprising:
   a controller;
   a fixed light source located on a non-moving portion of the amusement park ride;
   a viewing system having;
      a main portion having;
         at least one screen for displaying images to a user; and
         a plurality of photosensors for detecting the fixed light source located on a forward surface; and
      a closeout portion having;
         a plurality of magnetic couplers located on an aft surface of the closeout portion; and
         a release;
   a headgear system having:
      a masking member having;
         a viewing screen interface member having a plurality of magnetic couplers located on a forward surface of the masking member; and
         a closeout member; and
      a strapping system attached to the viewing screen interface member, the strapping system having;
         a first strap located over a head of the user;
         a second strap located behind the head of the user; and
         an adjustment member configured to change a length of the second strap.

2. The severable head mounted virtual reality display for an amusement park ride according to claim 1, further comprising:
   a tether coupled to the viewing system;
   wherein the tether is configured to retain the viewing system; and
   wherein the tether provides power and data to the viewing system from the controller.

3. The severable head mounted virtual reality display for an amusement park ride according to claim 1, further comprising:
   an actuator located on the closeout portion;
   wherein the actuator disengages the viewing system from the headgear system in response to the controller.

4. The severable head mounted virtual reality display for an amusement park ride according to claim 2, further comprising:
   a motion platform;
   wherein the tether is coupled to the motion platform.

5. The severable head mounted virtual reality display for an amusement park ride according to claim 2, further comprising:
a vehicle;
wherein the tether is coupled to the vehicle.

6. The severable head mounted virtual reality display for an amusement park ride according to claim 1, further comprising:
a battery system located on the viewing system.

7. The severable head mounted virtual reality display for an amusement park ride according to claim 1, wherein a polarity of the plurality of magnetic couplers located on an aft surface of the closeout portion is different than a polarity of the plurality of magnetic couplers located on the forward surface of the masking member.

8. The severable head mounted virtual reality display for an amusement park ride according to claim 1, wherein the headgear system is configured to be sanitized by a high temperature wash.

\* \* \* \* \*